E. P. BULLARD, Jr.
CUTTING LUBRICANT DEVICE FOR MACHINE TOOLS.
APPLICATION FILED NOV. 21, 1912.
1,076,948.
Patented Oct. 28, 1913.
3 SHEETS—SHEET 3.
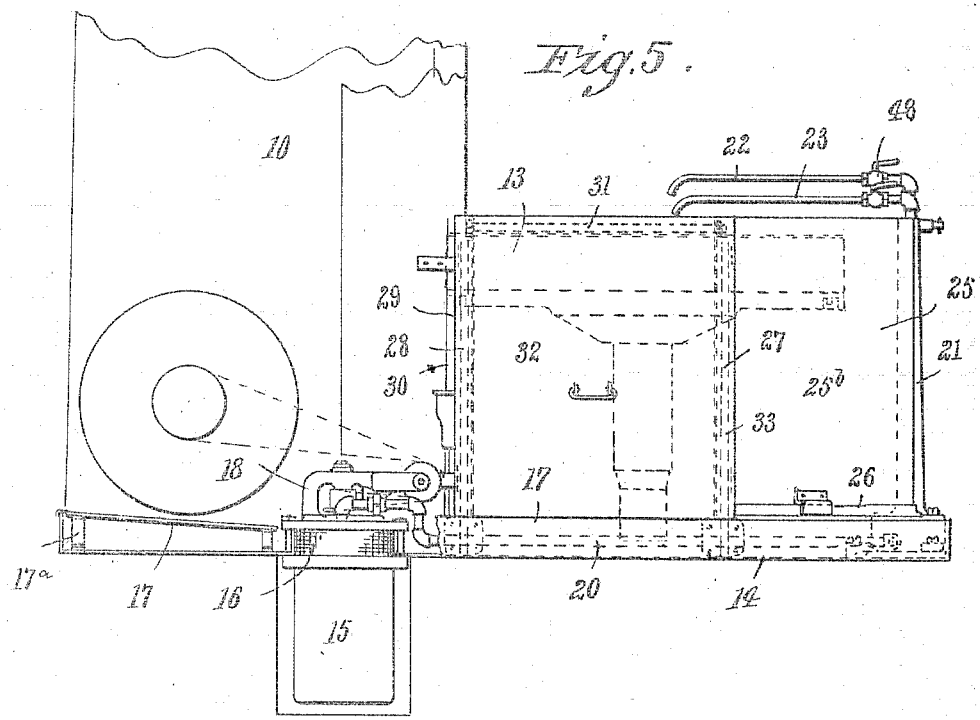
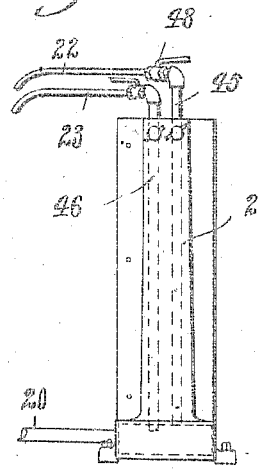
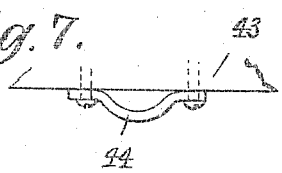
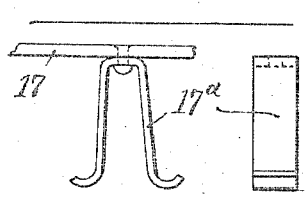
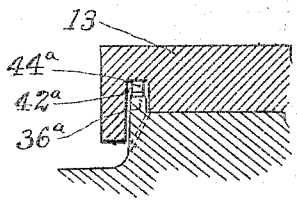
WITNESSES:
E. Carle Garlick
Mildred MacLeod
INVENTOR
Edward P. Bullard Jr.
BY
Chamberlain & Newman
ATTORNEYS

UNITED STATES PATENT OFFICE.

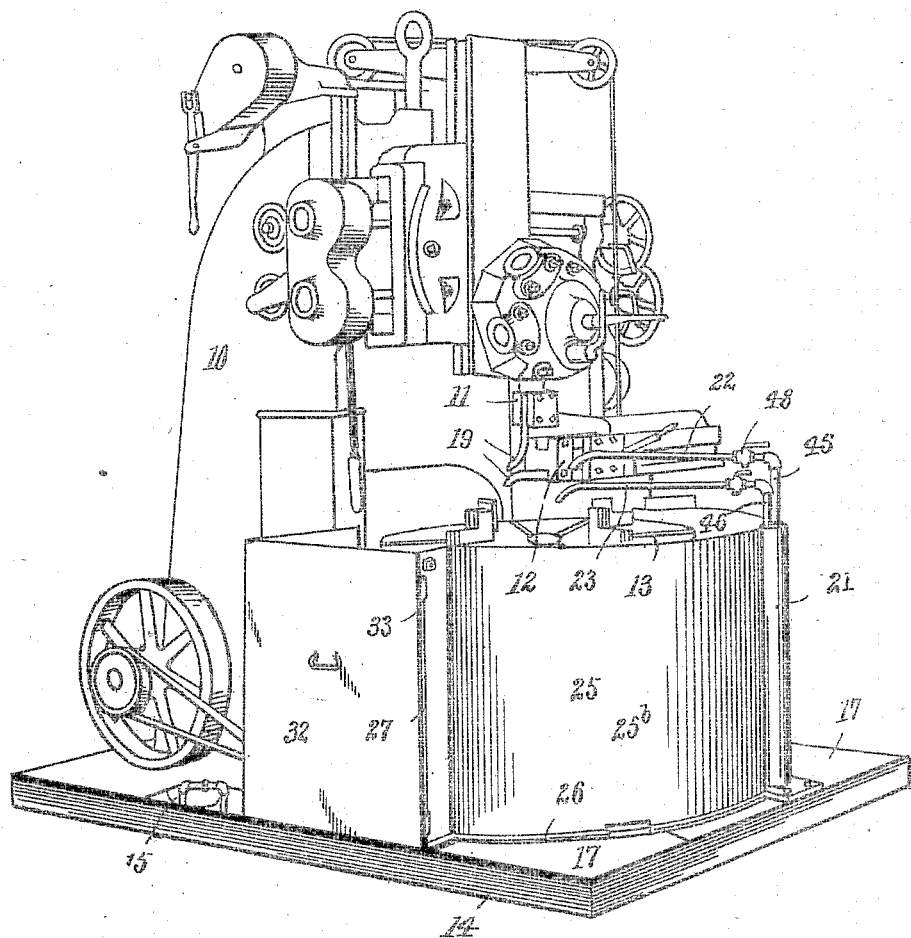

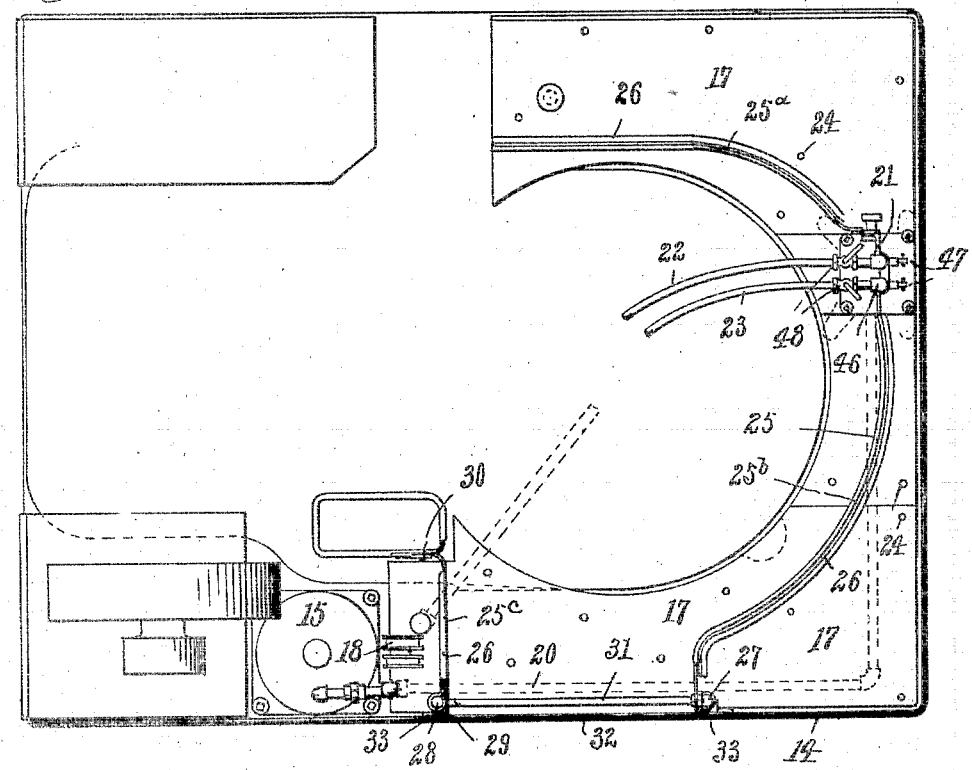

EDWARD P. BULLARD, JR., OF BRIDGEPORT, CONNECTICUT.

CUTTING-LUBRICANT DEVICE FOR MACHINE-TOOLS.

1,076,948.  Specification of Letters Patent.  Patented Oct. 28, 1913.

Application filed November 21, 1912. Serial No. 732,632.

*To all whom it may concern:*

Be it known that I, EDWARD P. BULLARD, Jr., citizen of the United States, and resident of Bridgeport, in the county of Fairfield and State of Connecticut, have invented certain new and useful Improvements in Cutting-Lubricant Devices for Machine-Tools, of which the following is a specification.

My invention refers to new and useful improvements in cutting lubricant devices for machine tools, employing rotary tables, as for instance, boring mills, vertical turret lathes, and the like.

The object of the invention is to provide means for supplying a continuous stream of lubricant to cutting tools of machines of the above class, and further to employ means for properly protecting the table bearing so that the lubricant cannot get into the bearing, but will be drained off, to be used again, to further lubricate and cool the cutting tools; to design the device so that it may be used in connection with a machine of the above class, at a very little additional cost and thereby materially add to its value.

Other objects of the invention will hereinafter appear and to these ends the invention consists in a cutting lubricant device for carrying out the above objects, embodying the features of construction, combination of elements and arrangement of parts having the general mode of operation substantially as hereinafter fully described and claimed in the specification and claims, and shown in the accompanying drawings in which, Figure 1 shows a front perspective view of the left front of an improved type of vertical turret lathe fitted with my novel form of cutting lubricant device. Fig. 2, is a plan of the pan and other cutting lubricant connections for the machine shown in Fig. 1. Fig. 3, is a central vertical sectional view of the lower part of the machine table and attached cutting lubricant device shown in Fig. 1. Fig. 4, is an enlarged detail section through the edge of table to agree with Fig. 3. Fig. 5, is a side view of the lower part of lathe and cutting lubricant device shown in Figs. 1 and 2. Fig. 6, is a detached front view of the adjustable manifold arranged in front of the machine and through which the lubricant is delivered to the cutting tools of the machine. Fig. 7, is an enlarged detail side view of a wiper attached to the under side of the table. Fig. 8, shows an enlarged edge and side view respectively of one of the supports for floor plates. Fig. 9, is a further enlarged detail sectional view through the edge portion of a table and bed illustrating a modified construction wherein the wiper is mounted upon the bed instead of the table.

The machine shown in the drawings is the same as one of the vertical turret lathes manufactured by me, but my improved form of lubricant attachment shown in connection therewith, is applicable to many other styles of boring or turning machines and its usefulness is not limited to the styles of lathe shown.

In the drawings 10 represents the frame work of the lathe, 11 the upper front and 12 the lower side tool heads respectively, which are designed to operate in the usual manner upon the work carried on the rotary table 13. The cutting tools over which the lubricant is discharged, are carried by these two heads and are adapted to be supplied thereto jointly or separately as required.

14 represents a base pan which is preferably formed of sheet metal and sufficiently large to more than accommodate the footings of the base of the lathe as will be readily understood from Figs. 1 and 2 of the drawings. A well 15 is secured to the under side of the base pan in a way to permit the drainings from the pan to flow therein. A screen 16 surrounds the entrance to the well to prevent chips and dirt from entering. A series of plates 17 serve to cover the pan and likewise form a floor upon which the operator may stand while at work upon the machine. These plates are obviously of a proper size and shape to fill the entire space between the sides of the pan and the sides of the base of the machine so as to completely cover all that portion of the pan which is not represented by the said base. Legs 17ª as shown in Figs. 3 and 8 are preferably used to support these plates by being first riveted to the plates at suitable distances apart and in a way which makes the plates removable.

In the rear side portion of the pan is arranged a pump 18 which may be connected and operated through a belt and pulley connection from any convenient part of the machine, and which obviously serves to continuously pump the lubricant from the well through the pipes and manifold upon the several tools 19 carried by the two tool heads. A single pipe connection 20 is arranged beneath the floor plates 17 of the pan 14 to connect the well with the manifold 21 arranged in the front of the rotary table 13 as will later be more fully explained. The two discharge pipes 22 and 23 serve to discharge the lubricant from the manifold upon the tools after which said lubricant flows down over the work table and bed upon the inner edge portions of the plate which, as will be seen is provided with suitable perforations 24 to allow the lubricant to flow therethrough into the pan.

The table 13 and work carried thereby are rotated at a varying rate of speed according to the work being done. The tendency, however, of this rotation is to throw the lubricant off and away from the table with more or less force, and therefore I provide a shield 25 that is supported upon the floor plates 17 of the pan and further secured to the manifold 21 and bed of the machine. This shield is spaced from the table and bed of the machine so as to allow ample room therebetween for the reception and accumulation of chips from the work. The shield is preferably formed in several sections. The first section which I will specifically designate as 25$^a$ has one end secured to the right side of the frame of the machine, and the other end is attached to the side of the manifold. A suitably formed strip of angle iron 26 has one flange secured to the floor plates and its other and upwardly disposed flange fastened to the outside of the shield so as to properly secure the same to the plate and in a way to prevent leakage of water therethrough to the outside. The second section of this shield which is represented by 25$^b$ is secured at one end to the before mentioned manifold, and the other end to a post 27 that is preferably formed of piping. The said post is secured to the floor plates 17 and is arranged adjacent to the outer edge portion of the pan. A second post 28, which is similar to the before mentioned post 27 is also secured to the floor plates, adjacent to the edge of the pan and to the rear of the first mentioned post 27. A further but short section of the shield 25$^c$ is secured to the floor plate and has one of its vertical edge portions 29 secured to the said post 28, and its other vertical edge portion 30 secured to the frame of the machine. The end portions of the sections 25$^b$ and 25$^c$ of the shield that is attached to the said posts 27 and 28 are braced and supported by a rod 31 which is arranged crosswise to connect the top portions of the shield so as to stiffen and strengthen the structure. A door 33 is provided with vertical grooves or ways 32 on each edge to engage the edges of the shields 25$^b$ and 25$^c$, and whereby the said door may be opened to allow the chips which accumulate within the shield to be raked out and removed, from time to time as occasion may require.

That portion of the base of the machine upon which the table operates is provided with a vertically disposed annular flange 34 and outside of it and above the driving gears is formed a short groove 35 and a short rib 36. The bevel gear 37 meshes with and drives the gear 38 of the table in the usual way to insure its rotation. A suitable opening may be formed in the bed to produce an outlet from the pocket for the gears to insure drainage. An annular groove 39 is formed in the under side of the table to receive the annular flange 34 before mentioned. A packing ring 40 is secured to the top edge of the annular flange 34 by means of a metal ring 41 and a series of screws as will be understood from Fig. 4 of the drawing. This packing ring closely fits the side walls of the annular recess 39 to prevent the cooling lubricant from working over into the gears 37 or table bearing. An outer annular groove 42 and rib 43 is also formed in the underside of the work table to accommodate the short rib 36 and the groove 35 of the base, just above the driving pinion to prevent the lubricant from working inward. A wiper 44 is secured to this annular rib 43 of the under side of the table, formed between the two grooves and serves to wipe out the short groove 35 formed in the top side of the base intermediate of the flange 34 and the rib 36 so that with each rotation of the table this portion of the connection between the base and table is wiped clean and dry of any and all lubricant which may have worked up over the said rib 43 and thus prevent it from getting up against the packing ring and possibly past it into the bearings.

In some instances I consider that it would be equally practicable to support the wiper 44$^a$ upon the bed as shown in Fig. 9 and so as to engage and wipe over the under annular edge portion of the table 13 as it turns around. In this case the wiper would preferably operate in an annular groove 42$^a$ as shown, and could be supported upon an upwardly disposed flange 36$^a$. Therefore, I do not wish to be limited to the placing of the wiper upon either the table or bed.

The manifold before referred to will be best understood from Figs. 3 and 6 and as will be noted consists of a receptacle into which the lubricant from the pump is first discharged through the pipe 20 and from which it is later forced out through the vertically adjustable pipes 45 and 46 and discharge pipes 22 and 23. The vertically arranged portions of these discharge pipes are secured in their proper positions after being adjusted by means of set screws 47, and can in this way be adjusted and made to register with the particular height of the cutting tools upon which they are discharging the water or other lubricant. A cut off valve 48 is arranged in each of these horizontal discharge pipes to regulate the flow of lubricant therefrom, as required.

Having thus described my invention what I claim and desire to secure by Letters Patent is:—

1. An attachment for machine tools, comprising a bed, a table rotatably mounted thereon, said bed having a groove adjoining the outer edge portion of the table, and a wiper mounted upon the table to clean the said groove.

2. An attachment for machine tools, comprising a bed having a pair of upwardly disposed flanges providing a groove therebetween, a table rotatably mounted upon the bed and over the flanges, and a wiper mounted to operate in the said groove to clean the same.

3. An attachment for machine tools, comprising a bed having a pair of upwardly disposed flanges forming a groove therebetween and provided with drainage openings, a table rotatably mounted thereon and having annular grooves in which the upper edge of the flange operates to prevent lubricant from working under the table.

4. An attachment for machine tools, comprising a bed having an inner and an outer flange, a table rotatably mounted upon the bed, and means for cleaning the space between the flanges to prevent lubricant from working under the table.

5. An attachment for machine tools, comprising a bed having upwardly disposed flanges, a table rotatably mounted thereon and having annular grooves to receive the flanges, an annular packing ring fitted on one of said flanges and in its groove in the table to prevent lubricant from working therepast.

6. An attachment for machine tools, comprising a bed, a table rotatably mounted thereon and having annular grooves formed in the table with outlets therefrom, a wiper secured to the table and adapted to operate against a portion of the bed to prevent lubricant from running under the table, and a packing ring also arranged between the table and bed.

7. An attachment for machine tools, comprising a bed, a table rotatably mounted thereon and having an annular groove in the outer edge portion of the table adjoining the bed to prevent lubricant from working under the table, and means for feeding the lubricant upon the table.

8. An attachment for machine tools, comprising a frame including a bed and upright and having an inner and outer flange on the bed adjoining the upright, a table rotatably mounted upon the bed, and means for cleaning the space between the flanges to prevent lubricant from working under the table adjacent to the upright.

9. An attachment for machine tools, comprising a frame including a bed and upright and having a groove across the bed adjacent to the upright, a table rotatably mounted thereon, a wiper carried by the table and adapted to be drawn through the groove of the bed with each turn of the table to prevent lubricant from working therepast.

10. An attachment for machine tools, comprising a bed, a table rotatably mounted thereon and having annular grooves formed in the underside of the table and having depending annular flanges surrounding the bed, and means for carrying lubricant from the pan to the table.

11. An attachment for machine tools, comprising a bed, a table rotatably mounted thereon, a pan surrounding the bed, a covering for the pan forming a floor, means for carrying lubricant from the pan to the table, and means to prevent the lubricant from working into the bearings of the table.

12. An attachment for machine tools, comprising a bed, a table rotatably mounted thereon, a pan surrounding the bed, a covering for the pan forming a floor, a well into which lubricant from the pan is drained, a pump for conveying the lubricant from the well to the table.

13. An attachment for machine tools, comprising a bed, a table rotatably mounted thereon, a pan surrounding the bed, a floor covering for the pan around the bed, a shield mounted upon the floor covering and extending up around the bed and table, means for conveying lubricant from the pan to the table.

14. The combination with a machine tool of the class described, of a pan surrounding the tool, a floor for covering that portion of the pan surrounding the base of the machine, and a shield mounted upon the floor and extended up beside the work table of the machine to catch lubricant and direct it into the pan.

15. An attachment for machine tools, comprising a bed, a table rotatably mounted upon the bed, a wiper secured to the table and carried therewith and adapted to engage and wipe off lubricant from a portion of the bed beneath the table.

16. An attachment for machine tools, comprising a bed, a table rotatably mounted upon the bed, a wiper secured to one of said parts and adapted to engage and clean off the other part to prevent lubricant from working between the two.

17. An attachment for machine tools, comprising a bed member, having upwardly disposed flanges, a movable table member mounted upon the bed and having one or more downwardly disposed flanges which fit in and operate between the flanges of the bed, a wiper secured to one of said members and adapted to engage and clean off the other member to prevent lubricant from working between said members.

Signed at Bridgeport in the county of Fairfield and State of Connecticut this 18th day of Nov. A. D., 1912.

EDWARD P. BULLARD, Jr.

Witnesses:
D. B. BULLARD,
JOHN D. HUGHES.